United States Patent
Tsuji et al.

(10) Patent No.: US 7,399,436 B2
(45) Date of Patent: Jul. 15, 2008

(54) DIE OPENING AND CLOSING SYSTEM AND DIE OPENING AND CLOSING METHOD

(75) Inventors: Makoto Tsuji, Kanagawa (JP); Saburo Noda, Kanagawa (JP); Toshiaki Toyoshima, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 138 days.

(21) Appl. No.: 11/534,428

(22) Filed: Sep. 22, 2006

(65) Prior Publication Data

US 2007/0071845 A1    Mar. 29, 2007

(30) Foreign Application Priority Data

Sep. 26, 2005    (JP)    ............... P2005-277097

(51) Int. Cl.
*B29C 45/64*    (2006.01)
(52) U.S. Cl. ............... 264/40.1; 164/4.1; 164/137; 164/154.1; 164/343; 425/135; 425/589; 425/451.7
(58) Field of Classification Search ............... 264/40.1, 264/328.1; 425/135, 150, 167, 589, 450.1, 425/451.7; 164/4.1, 137, 154.1, 342, 343
See application file for complete search history.

(56) References Cited

U.S. PATENT DOCUMENTS

| | | | | |
|---|---|---|---|---|
| 5,352,394 A | * | 10/1994 | Fujita et al. | ............... 425/589 |
| 5,912,020 A | * | 6/1999 | Grunitz | ............... 425/595 |
| 6,843,647 B2 | * | 1/2005 | Fujita et al. | ............... 425/451.7 |

FOREIGN PATENT DOCUMENTS

| | | |
|---|---|---|
| JP | 2002-154146 | 5/2002 |
| JP | 2002-225101 | 8/2002 |

OTHER PUBLICATIONS

Office Action issued in counterpart Korean Application No. 10-2006-0092604, dated Sep. 20, 2007.

\* cited by examiner

*Primary Examiner*—James Mackey
(74) *Attorney, Agent, or Firm*—DLA Piper US LLP (57) ABSTRACT

A die opening and closing system includes a fixed die plate holding a fixed die, a moveable die plate holding a moveable die able to move in a horizontal die opening and closing direction with respect to said fixed die plate, only one ball-screw feed mechanism moving said moveable die plate in a die opening and closing direction, and only one balance cylinder system reducing a load of said ball-screw feed mechanism and a die opening and closing method related to the same.

5 Claims, 6 Drawing Sheets

DIE OPENING AND CLOSING SYSTEM AND DIE OPENING AND CLOSING METHOD

BACKGROUND OF THE INVENTION

1. Field of the Invention

The present invention relates to a die opening and closing system and die opening and closing method used for die cast machines and other molding machines.

2. Description of the Related Art

A die opening and closing system (clamping system) for making a moveable die plate by a ball-screw feed mechanism back advance and retract in a die opening and closing direction to open/close a die is known. Japanese Patent Publication (A) No. 2002-154146 discloses a die opening and closing system provided with two ball-screw feed mechanisms at symmetric positions on the two sides of the die opening and closing system. Japanese Patent Publication (A) No. 2002-225101 discloses a die opening and closing system provided with only one ball-screw feed mechanism. Note that a die opening and closing system for opening and closing a die by an oil pressure cylinder is also known.

A ball-screw feed mechanism is, in comparison to an oil pressure cylinder, generally accurately controllable, but has difficulty in obtaining a high drive force. As a result, for example, providing a ball-screw feed mechanism in a large die opening and closing system requiring a high drive force etc. will raise the initial costs. That is, in cases such as in Japanese Patent Publication (A) No. 2002-154146 where two ball-screw feed mechanisms are provided to obtain the drive force, the initial costs become higher than a case where there is one ball-screw feed mechanism, and, in cases such as in Japanese Patent Publication (A) No. 2002-225101 where one ball-screw feed mechanism is provided, the ball-screw feed mechanism becomes larger and loses its versatility, causing the ball-screw feed mechanism unit price to rise. Therefore, to achieve low costs while keeping the superiority in controllability of the ball-screw feed mechanism, it is necessary to reduce the load of the ball-screw feed mechanism.

SUMMARY OF THE INVENTION

An object of the present invention is to provide a die opening and closing system and die opening and closing method able to reduce the load of a ball-screw feed mechanism that makes a moveable die plate advance and retract.

According to a first aspect of the present invention, there is provided a die opening and closing system including a fixed die plate holding a fixed die, a moveable die plate holding a moveable die and able to move in a horizontal die opening and closing direction with respect to the fixed die plate, only one ball-screw feed mechanism moving the moveable die plate in a die opening and closing direction, and only one balance cylinder system reducing a load of the ball-screw feed mechanism.

Preferably, the ball-screw feed mechanism has only one rotatable screw shaft extending in the die opening and closing direction and limited in movement in an axial direction with respect to the fixed die plate, a movable member fixed to the moveable die plate and into which the screw shaft is screwed, and a motor rotating the screw shaft to move the moveable member in a die opening and closing direction; the balance cylinder system has a rod fixed to one of the moveable die plate and fixed die plate, a piston fixed to the rod, and only one cylinder fixed to the other of the moveable die plate and fixed die plate, holding the piston, and having a first cylinder chamber and a second cylinder chamber divided by the piston; and the system further includes; a fluid pressure control feeding part feeding fluid to the first cylinder chamber and the second cylinder chamber to control the pressure of the first cylinder chamber and the second cylinder chamber, and a controlling part controlling operations of the motor and the fluid pressure control feeding part.

Preferably, the controlling part, based on an output of the motor, maintains the load of the motor to a predetermined value by controlling the operation of the fluid pressure control feeding part.

Preferably, the fluid pressure control feeding part has an air tank or an accumulator alleviating pressure changes of the first cylinder chamber and the second cylinder.

According to a second aspect of the present invention, there is provided a die opening and closing method making a moveable die plate holding a moveable die advance and retract in a horizontal die opening and closing direction with respect to a fixed die plate holding a fixed die, which comprises providing only ball-screw feed mechanism moving the moveable die plate in a die opening and closing direction and only one balance cylinder system reducing a load of the ball-screw feed mechanism and, based on an output of a motor serving as a drive source of the ball-screw feed mechanism, maintains a load of the motor at a predetermined value by controlling an operation of the balance cylinder system.

According to the present invention, the load of the ball-screw feed mechanism can be reduced.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
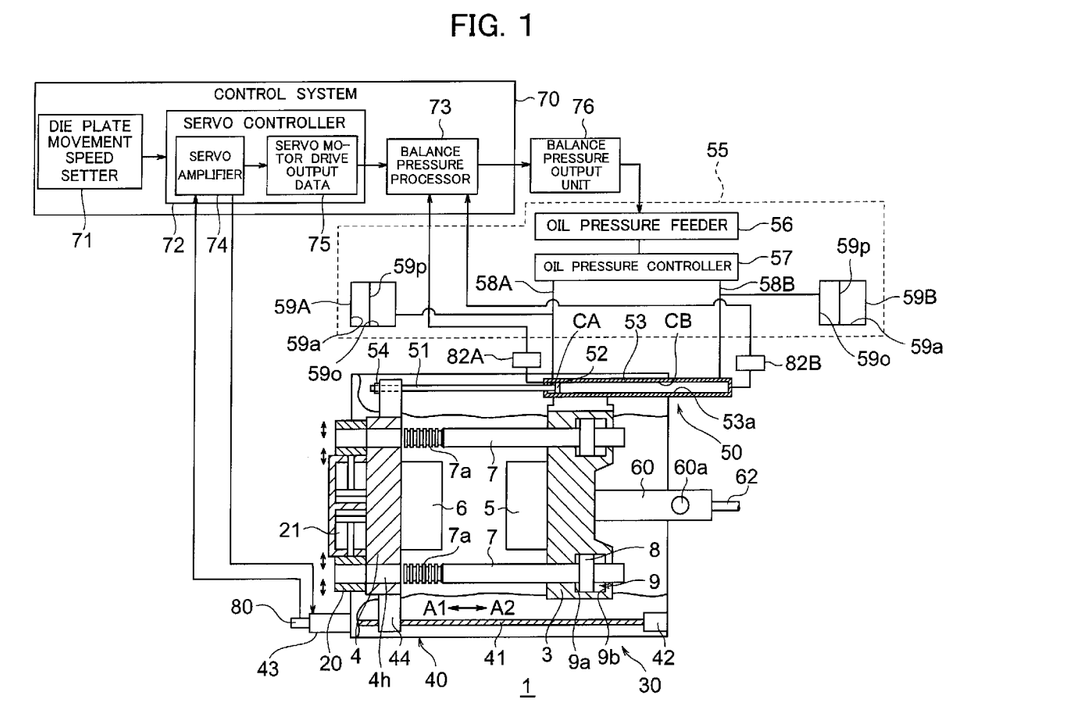
FIG. 1 is a top view including a sectional view for a part showing a clamping system of an embodiment of the present invention in a die opening state.
Figure 2:
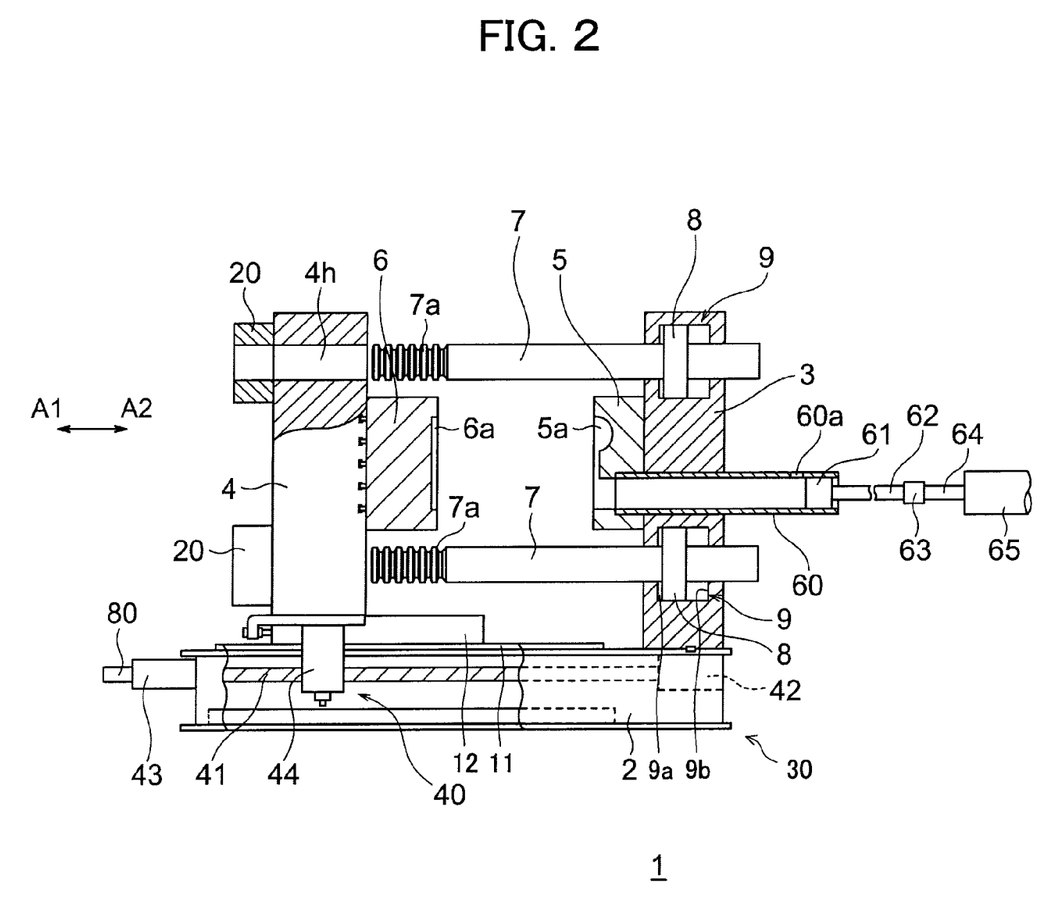
FIG. 2 is a front view including a sectional view for a part showing the clamping system of FIG. 1 in the die opening state.

FIG. 1 is a top view including a sectional view for a part showing a configuration of a clamping system (die opening and closing system) 1 according to an embodiment of the present invention. FIG. 2 is a front view (a view seen from the lower part of FIG. 1) including a sectional view for a part showing a configuration of the mechanical portion of the clamping system 1 of FIG. 1. Note that FIG. 1 and FIG. 2 show the die opening state.

The clamping system 1 is comprised as a so-called composite type clamping system and is provided with a movement mechanism 30 used mainly for die opening and closing and clamping cylinders 9 used mainly for clamping. Further, the clamping system 1 is provided with a fixed die plate 3, a moveable die plate 4, tie bars 7, half nuts 20, and a control system 70 for controlling the operations of each means.

The fixed die plate 3 is fixed on a horizontal surface of a base 2. This fixed die plate 3 holds a fixed die 5 on a vertical die mounting surface. The moveable die plate 4 holds a moveable die 6 on a vertical die mounting surface. The pair of dies comprised of the fixed die 5 and the moveable die 6 are closed to form a cavity between a hollow 5a (see FIG. 2) of the fixed die 5 and a hollow 6a (see FIG. 2) of the moveable die 6.

The moveable die plate 4 is provided on top of base 2 to be able to move between a die opening position and a die closing position in a horizontal die opening direction A1 and a die closing direction A2. For example, as shown in FIG. 2, a slider is comprised by a sliding plate 11 fixed on top of the base 2 and a sliding plate 12 fixed at a lower part of the fixed moveable die plate 4 and slidable with respect to the sliding plate 11, whereby the moveable die plate 4 is movably supported with respect to the base 2. Note that the sliding plate 11 may be provided with a guide comprised of a ridge or a groove extending in the die opening and closing direction, while the sliding plate 12 may be provided with a guided part engaging with the guide.

A sleeve 60 is provided at the back surface of the fixed die plate 3. As shown in FIG. 2, a plunger tip 61 fitted into the sleeve 60. the plunger tip 61 is connected at the front end of a plunger rod 62. The plunger rod 62 is connected through a coupling 63 to a piston rod 64 of an injection cylinder 65.

The injection cylinder 65 is driven by oil pressure and makes the piston rod 64 advance and retract. Molten metal ML is fed to sleeve 60 through a feeding port 60a. In that state, the piston rod 64 is made to advance, whereby the cavity C formed between the clamped fixed die 5 and moveable die 6 is injected and filled with the molten metal ML as the molding material.

Note that the parts 60 to 65 form an injection system, and the clamping system 1 and the injection system form a die cast machine (molding machine). Further, in the clamping systems 1, the components contributing to the die opening and closing function, for example, the movement mechanism 30 and the control system 70, form the die opening and closing system.

Four tie bars 7 are for example provided at symmetrical positions with respect to the mounting positions of the fixed die 5 and the moveable die 6 and are supported horizontally by the fixed die plate 3. Note that the moveable die plate 4 sides of the tie bars 7 are designed as free ends. The moveable die plate 4 is formed with through holes 4h in which the tie bars 7 are inserted along with the die closing operation.

A piston 8 built in the clamping cylinder 9 is provided on the end of each tie bar 7 at the fixed die plate 3 side. A coupled part 7a is formed in the end of the tie bar 7 at the moveable die plate 4 side. The coupled part 7a, for example, is comprised of a plurality of grooves extending in the peripheral direction at the outer circumference of tie bar 7 arranged in the axial direction of the tie bar 7. Note that the grooves may also be formed in a spiral shape.

Each clamping cylinder 9 is formed at the inside of the fixed die plate 3. This fixed die plate 3 holds the piston 8 so that it is moveable. High pressure working oil (working fluid) is fed to the first cylinder chamber 9a or the second cylinder chamber 9b divided by the piston 8 of the clamping cylinder 9 causing a force to act between the fixed die plate 3 and tie bar 7 and drive the tie bar 7 with respect to the fixed die plate 3. Note that the operation for feeding the working fluid, for example, is performed by the control system 70 controlling a not shown control valve opening and closing working fluid oil passages of the cylinder chambers divided by the piston 8.

Each half nut 20 is arranged at the back of a through hole 4h of the moveable die plate 4. Not shown ridges able to engage with the coupled part 7a of the tie bar 7 are formed at this half nut 20. That is, the coupled part 7a and the half nut 20 are formed in a sawtooth shape and are able to engage with each other together.

Each half nut 20 is opened and closed by a half nut opening and closing cylinder 21. When the half nut 20 is closed and engages (couples) with the coupled part 7a of the tie bar 7, the tie bar 7 and the moveable die plate 4 are connected. When the half nut 20 is opened, the connection of the tie bar 7 and the moveable die plate 4 is released.

The movement mechanism 30 is comprised by a single ball-screw feed mechanism 40, a single balance cylinder system 50, and a hydraulic circuit 55 controlling the fluid pressure of the balance cylinder system 50.

The ball-screw feed mechanism 40, as shown in FIG. 1, is provided on one side as seen in the die opening and closing direction (the lower part of FIG. 1) and, as shown in FIG. 2, is provided at the base 2. The ball-screw feed mechanism 40 has a screw shaft 41, a support member 42, a servo motor 43, and a moveable member (nut) 44.

A single screw shaft 41 is provided in the ball-screw feed mechanism 40 and extends in a horizontal direction. The support member 42 is fixed at the base 2, that is, is fixed with respect to the fixed die plate 3 and rotatably supports one end of the screw shaft 41. The other end of the screw shaft 41 is connected to a servo motor 43 fixed to the base 2. The moveable member 44 is fixed to the moveable die plate 4 and has the screw shaft 41 screwed into its not shown female thread.

In the ball-screw feed mechanism 40, the rotation of the servo motor 43 is controlled to rotate the screw shaft 41. The rotation of the screw shaft 41 is changed to linear motion of the moveable member 44. Due to this, the moveable die plate 4 is driven in the die opening direction A1 or the die closing direction A2. Note that, in FIG. 1 and FIG. 2, the case of the screw shaft 41 having a length extending to the base 2 is illustrated, however, it is sufficient that the screw shaft 41 have a length extending to the range of movement of the moveable member in die opening and closing operation.

The balance cylinder system 50, as shown in FIG. 1, is provided at a symmetrical position on the side opposite to the ball-screw feed mechanism (upper side of FIG. 1) when seen in the die opening and closing direction. Further, the balance cylinder system 50 is provided at the base 2. Note that, in FIG. 2, the balance cylinder system 50 is not shown because it is hidden by the ball-screw feed mechanism 40. The balance cylinder system 50 is provided with a rod 51, a piston 52, and one cylinder 53.

The rod 51 extends in the die opening and closing direction. One end of it is fixed to the moveable die plate 4. The rod 51 is fixed to the moveable die plate 4 by, for example, inserting the reduced diameter part of the rod 51 into a through hole provided in the moveable die plate from the die mounting surface side and screwing a nut 54 over a male thread provided at the reduced diameter part of the rod 51 at the back surface side of the moveable die plate 4 (the opposite side from the die mounting surface).

The piston 52 is fixed to the end of the rod 51 at the fixed die plate 3 side. The piston 52 is held in a cylinder chamber 53a of the cylinder 53. The cylinder chamber 53a of the cylinder 53 is divided into a first cylinder chamber CA and a second cylinder chamber CB. Therefore, the piston 52 slides inside the cylinder chamber 53a by the pressure differential between the first cylinder chamber CA and the second cylinder chamber CB.

The cylinder 53 is fixed with respect to the base 2. That is, it is fixed with respect to the fixed die plate 3. Further, the cylinder 53 extends in the die opening and closing direction. Therefore, by sliding the piston 52 inside the cylinder chamber 53a, the balance cylinder system 50 can bias the moveable die plate 4 through the rod 51 toward the die opening and closing direction.

The lengths and mounting positions of the rod 51 and the cylinder 53 are set to enable the moveable die plate 4 to be biased in the range from the die closing position until the die opening position. For example, they are set so that at the die opening position, the piston 52 is positioned near the end of the moveable die plate 4 side of the cylinder chamber 53a and so that at the die closing position, the piston 52 is positioned near the end of the fixed die plate 3 side of the cylinder chamber 53a.

Note that FIG. 1 and FIG. 2 illustrate a case where the rod 51 is fixed at the moveable die plate 4, and the cylinder 53 is fixed at the fixed die plate 3, however, the rod 51 may also be fixed with respect to the fixed die plate 3, and the cylinder 53 may be fixed with respect to the moveable die plate 4.

The hydraulic circuit (fluid pressure control feeding part) 55 controls the pressures of the first cylinder chamber CA and second cylinder chamber CB. The hydraulic circuit 55 includes an oil pressure feeder comprised by a not shown pump, accumulators, etc., an oil pressure controller 57 comprised of a not shown direction control valve etc., and an oil passage 58A linking the first cylinder chamber CA and oil passage 58B linking the second cylinder chamber CB (hereafter sometimes called simply the "oil passages 58" to not differentiate between them). In the oil pressure feeder 56, a not shown engine or electric motor rotates the oil pressure pump to generate oil pressure and a not shown accumulator stores the oil pressure energy. The oil pressure controller 57 controls the flow direction, pressure, and flow rate of the oil in the oil passages 58A and 58B.

Further, at the downstream side of the oil pressure controller 57, the hydraulic circuit 55 is provided with an accumulator 59A linked to the oil passage 58A and an accumulator 59B linked to the oil passage 59B (hereafter sometimes simply called the "accumulators 59" to not differentiate between them). Each accumulator 59 is provided with a partition 59p dividing an oil pressure chamber 59o and a gas chamber 59a. The oil chamber 59o is linked to the oil passage 58. The partition 59p moves until the pressure of the pressure oil chamber 59o and the pressure of the gas chamber 59a become identical due to the compression or expansion of the gas (for example air) inside the gas chamber. Further, each accumulator may be selected from a bladder type, piston type, diaphragm type, or other suitable type.

The control system 70 is comprised by for example, a CPU, ROM, RAM, etc. and is provided with a die plate movement speed setter 71, a servo controller 72, and a balance pressure processor 73.

The die plate movement speed setter 71 sets a target value of the movement speed of the moveable die plate 4. The movement speed is set, for example, by the die plate movement speed setter 71 reading the movement speed target value held in a storage device or by the die plate movement speed setter 71 calculating the movement speed target value corresponding to the die opening position and the die thickness. Further, the die plate movement speed setter 71 converts the target value into the rotational speed of the servo motor 43 and outputs it to the servo controller 72.

The servo controller 72 controls the operation of the servo motor 43 based on the target value output from the die plate movement speed setter 71. Specifically, the servo amplifier 74 controls the electric current output to the servo motor 43 so that the rotational speed detected by an encoder 80 of the servo motor 43 reaches the target value output from the die plate movement speed setter 71.

Note that the encoder 80, for example, is comprised by either an optical or a magnetic encoder 80 and outputs a number of pulses corresponding to the amount of rotation. The control system 70 counts the pulse train from the encoder 80 and converts the count to the distance of movement of the moveable die plate 4 so as to specify the position of the moveable die plate 4 and differentiates the distance of movement to calculate the movement speed.

The balance pressure processor 73 calculates the target pressures at the first cylinder chamber CA and second cylinder chamber CB (balance pressures) based on the servo motor drive output data 75 output from the servo amplifier 74 for balancing the resistance force generated at the time of movement of the moveable die plate 4 to the die opening and closing direction and the biasing force of the balance cylinder system 50.

Further, the balance pressure processor 73 receives the detected values of a pressure sensor 82A detecting the pressure inside the first cylinder chamber CA and a pressure sensor 82B detecting the pressure inside the second cylinder chamber CB (hereafter sometimes simply called the "pressure sensors 82" to not differentiate between them). The balance pressure processor 73 performs feedback control with respect to the oil pressure feeder 56 and oil pressure controller 57 so that the detected values of the pressure sensors 82 become the calculated balance pressures.

Note that the control signal of the balance pressure processor 73 is output to a balance pressure output part 76, converted to a voltage corresponding to the driving amount of the oil pressure feeder 56 and the oil pressure controller 57, and output to the hydraulic circuit 55.

The operation of the clamping system having the above configuration will be explained next.

The clamping system 1 of the state shown in FIG. 1 and FIG. 2 is in a state wherein the moveable die plate 4 is moved to a predetermined die opening position. From this state, it drives the movement mechanism 30 to move the moveable die plate 4 toward the die closing direction A2.

Figure 3A:
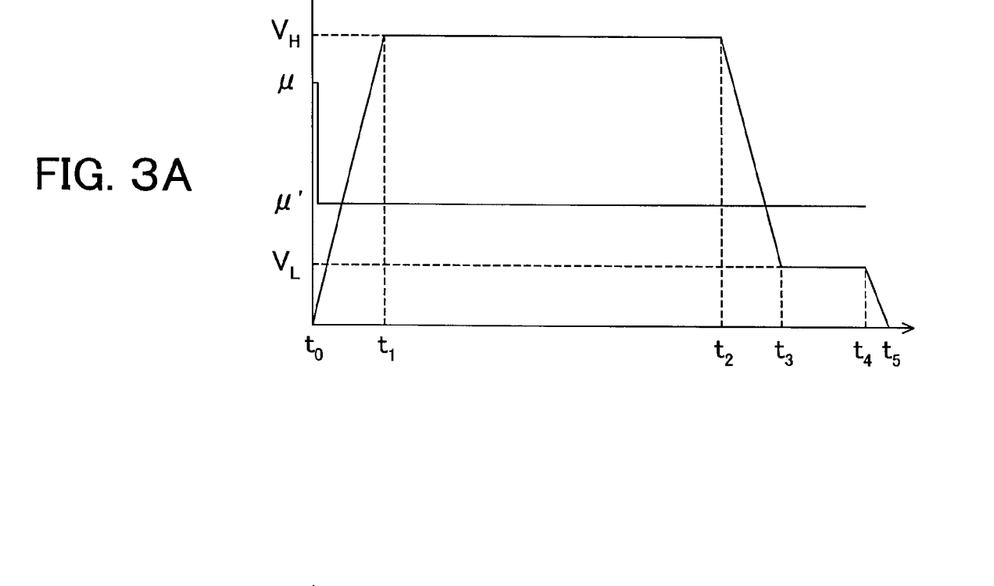
FIG. 3A and FIG. 3B are views showing the changes along with time of the speed and resistance force of a moveable die plate of the clamping system of FIG. 1.

FIG. 3A shows the change along with time of the movement speed of the moveable die plate 4. The ordinate indicates the speed of the moveable die plate 4, while the abscissa indicates the time. The movement speed of the moveable die plate 4 is set to a comparatively fast speed $V_H$ from the time t1 immediately after the beginning of the movement until the time t2 right before the moveable die 6 contacts the fixed die 5 from the viewpoint of reduction of the cycle time, then is set to a comparatively low speed $V_L$ from the time t3 right before die contact from the viewpoint of the protection of the moveable die 6 and the fixed die 5. Further, the fixed die 5 contacts the moveable die 6 thereby ending the die closing operation.

Next, each half nut 20 closes and engages with the coupled part 7a of the corresponding tie bar 7. By doing this, each tie bar 7 is coupled to the moveable die plate 4. Note that at the time of engagement, any positional deviation between a half nut 20 and the coupled part 7a of the tie bar 7 smaller than the pitch of the coupling grooves is eliminated by feeding working fluid to the cylinder chambers of the clamping cylinder 9 to finely adjust the position inside the clamping cylinder 9 of the piston 8 of each tie bar 7.

Afterwards, high pressure working fluid is fed to the first cylinder chambers 9a of the clamping cylinders 9 at the moveable die plate 4 side to conduct the clamping. By doing this, the tie bars 7 extend to generate a clamping force corresponding to the amounts of extension of the tie bars 7. In this state, the cavity formed between the fixed die 5 and the moveable die 6 is injected and filled with molten metal from the sleeve 60.

When the melt solidifies inside the cavity to form a die casting, the feed of the pressurized oil to the first cylinder chambers 9a of the clamping cylinders 9 is halted and the pressurized oil is fed to the second cylinder chambers 9b to thereby perform the initial operation of the die opening. Note that at this time, the servo motor 43 is in a torque-free state. When the dies are opened by a predetermined amount, the feed of the pressurized oil to the second cylinder chambers 9b is halted, and the half nuts 20 are opened to decoupling of the half nuts 20 and the coupled parts 7a.

Next, the movement mechanism 30 is driven to move the moveable die plate 4 toward the die opening direction A1. At this time, as in the case during die closing, the moveable die plate 4 is moved at the beginning of movement at a comparatively high speed, then, when reaching a predetermined position, the moveable die plate 4 is reduced in speed and moved at a comparatively low speed. Afterwards, the moveable die plate 4 reaches the die opening position, the molded object is removed, a mold release agent is coated on the fixed die 5 and the moveable die 6, and other processing is performed, whereupon the molding cycle is ended.

During die opening and die closing, the movement mechanism 30 balances the biasing force of the balance cylinder system 50 and the resistance force of the moveable die plate 4 while driving the moveable die plate 4 by the ball-screw feed mechanism 40 for speed control. Specifically, this is as follows.

The resistance force during the movement of the moveable die plate 4 in the die opening and closing direction includes mechanical resistances generated from mechanical factors inside the clamping system 1 and air resistance received by the moveable die plate 4, but the dominant resistance is the mechanical resistance. Further, among the mechanical resistances, the dominant ones are the frictional resistances such as between the moveable die plate 4 and the base 2 and between the screw shaft 41 and the moveable member 44.

Among the frictional resistances, generally the static friction coefficient μ is larger than the dynamic friction coefficient μ', and the speed dependence and acceleration dependence of the dynamic friction coefficient μ' are very small. Therefore, as shown in FIG. 3A, the friction coefficient becomes the comparatively large static friction coefficient μ at the beginning of the movement. After the beginning of the movement, regardless of acceleration or deceleration, the friction coefficient is kept to be a comparatively small dynamic friction coefficient μ' approximately.

However, viewed closely, due to the speed dependence of the frictional resistance, positional dependence of the resistance forced due to warping of the sliding plates 11 and 12, positional dependence of the resistance force due to warping of the screw shaft 41 and moveable member 44, positional dependence of the resistance force due to variations in the lubricating oil, and other various factors, the resistance force will fluctuate even after the moveable die plate 4 begins to move.

Figure 3B:
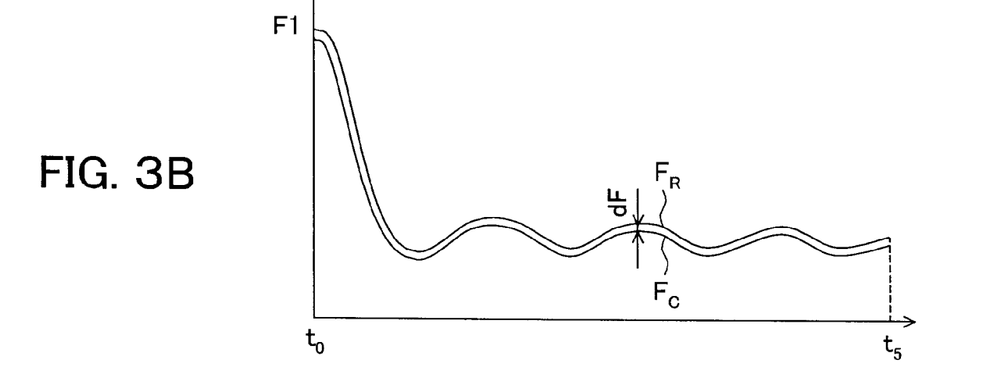

Therefore, the resistance force $F_R$ when the servo motor 43 is driven to move the moveable die plate 4 conceptually changes along with time as shown by the solid line in FIG. 3B. The ordinate of FIG. 3B indicates the resistance force, while the abscissa of FIG. 3B indicates the time.

That is, the resistance force $F_R$ becomes a comparatively large value F1 due to the effect of the static frictional force at the initial movement of the moveable die plate 4. Afterwards, after the initial movement of the moveable die plate 4, the dynamic frictional force is smaller than the static friction force, so the resistance force $F_R$ becomes smaller than the value F1. Further, the resistance force $F_R$ fluctuates by a comparatively fine width due to the speed dependence and the positional dependence.

Therefore, the clamping system 1 controls the operation of the hydraulic circuit 55 so that the biasing force $F_C$ by which the balance cylinder system 50 biases the moveable die plate 4 is kept less than the resistance force $F_R$ by dF. Due to this, if the servo motor 43 generates a torque (load torque, frictional torque) corresponding to the force dF and outputs an acceleration torque for accelerating the moveable die plate 4, the moveable die plate 4 can be driven. That is, the clamping system 1 controls the operation of the hydraulic circuit 55 so that the servo motor 43 load (load torque) becomes a predetermined setting.

It is possible to control the hydraulic circuit 55 so that the biasing force $F_c$ matches with the resistance force $F_R$ and to output only the acceleration torque by the servo motor 43. That is, the predetermined setting can be made 0. However, in this case, if, for example, the biasing force Fc surpasses the resistance force $F_R$ due to the time lag and other such problems in control, a backlash is generated between the screw shaft 41 and the moveable member 44, causing a possible risk of a drop in the accuracy of drive control of the moveable die plate 4 by the servo motor 43. Therefore, the force dF is a safety margin used for solving these kinds of problems and may be set to an appropriate size.

Figure 4:
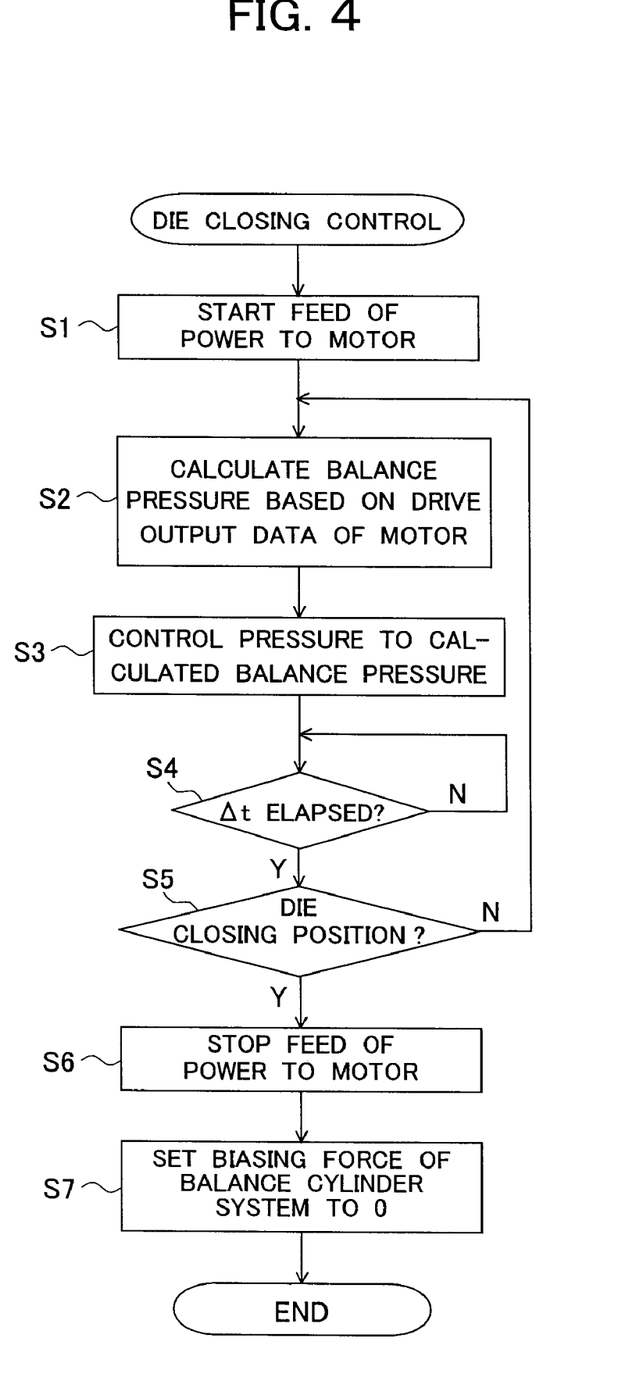
FIG. 4 is a flow chart showing the routine of die opening control executed by a control system of the clamping system of FIG. 1.

FIG. 4 is a flowchart showing the routine of the processing of the die closing control executed by the control system 70 during a die closing operation. This processing is begun when the predetermined beginning conditions of the die closing operation are fulfilled, for example, when a signal expressing the end of the previous mold cycle is input.

First, the control system 70 starts to feed power to the servo motor 43 through the servo amplifier 74 (step S1). Note that afterwards, the servo amplifier 74 conducts feedback control so that the speed based on the detection result of the encoder 80 becomes a target value set by the die plate movement speed setter 71, however, this is omitted in FIG. 4. Feedback control of the servo amplifier 74 is conducted in parallel with steps S2 to S5 until the later explained step S6. The servo controller 72 determines the timing of change of speed from the speed $V_H$ to the speed $V_L$, for example, based on the position of the moveable die plate 4 determined by the detection results of the encoder 80. When the timing for changing the speed arrives, it changes the target value based on the signal from the die plate movement speed setter 71.

At step S2, the balance pressures is calculated based on the servo motor driving output data 75. For example, the servo motor driving output data 75 includes information of the generated torque T1 of the servo motor 43 calculated from the electric current being output to the servo motor 43 from the servo amplifier 74. The balance pressure processor 73 of the control system 70 holds the target value T2 of the generated torque of the servo motor 43. The target value T2, as explained above, is the sum of the load torque corresponding to the force dF and the acceleration torque of the moveable die plate 4. Note that the acceleration torque changes with the speed change of the moveable die plate 4, so the target value T2 is also changed by the position of the moveable die plate 4. The balance pressure processor 73 calculates the difference between the generated torque T1 and the target value T2 (T1-T2) as a biasing force $F_C$ to be generated by the balance cylinder system 50 (the resistance force to be negated by the balance cylinder system 50). Further, the balance pressure processor 73 calculates the pressures of the first cylinder chamber CA and second cylinder chamber CB (balance pressures) needed for generating the biasing force $F_C$.

At step S3, the pressures of the first cylinder chamber CA and second cylinder chamber CB are controlled so that they become the balance pressures calculated at step S2. This control is feedback control. The control amount based on the detection results from the pressure sensor 82 and the calculated balance pressures is output to the hydraulic circuit 55 through the balance pressure output part 76.

At step S4, the system stands by until a time of Δt from step S3 passes. At step S5, based on the detection results from the encoder 80, it is judged if the moveable die plate 4 has reached the die closing position. If judged to have not reached the die closing position, the routine returns to step S2, and steps S2 through S4 are repeated. Note that step S5 may be conducted in parallel with steps S2 through S4 at cycles of different lengths from Δt.

Here, step S4 shows that the control amount is changed at each predetermined time interval Δt in feedback control. The time interval Δt may be set to an appropriate length.

For example, in cases wherein the servo amplifier 74 conducts feedback control to keep the moveable die plate 4 speed at $V_H$, if the biasing force $F_C$ of the balance cylinder system 50 is increased from target value of the biasing force, the servo amplifier 74 will lower the electric current output to the servo motor 43 so that the servo motor 43 torque will be reduced by that increased amount of the biasing force. That is, the fluctuations of the biasing force $F_C$ of the balance cylinder system 50 are absorbed by the servo motor 43. By doing this, the speed of the moveable die plate 4 is maintained at the target value. However, for example, if the time lag of the servo motor 43, is not sufficiently small with respect to the time lag of the balance cylinder system 50, the fluctuations of the balance cylinder system 50 cannot be absorbed by the servo motor 43, causing control to become unstable. Therefore, the Δt may be set comparatively long with respect to the time interval of feedback control of the servo amplifier 74.

However, generally, as the time lag of the servo motor is shorter than the time lag of the oil pressure cylinder, the Δt may be set to a time length used generally in feedback control of oil pressure cylinders.

When it is judged at step S5 that the die closing position has been reached, the electric current feed to the servo motor 43 is halted (step S6). At this time, as the biasing force $F_C$ of the balance cylinder system 50 is smaller than the resistance force $F_R$ and as the moveable die plate 4 receives the reactive force from the fixed die plate through the moveable die 6 and fixed die 5, the moveable die plate 4 halts. At step S7, the control system 70 controls the operation of the hydraulic circuit 55 so that the biasing force $F_C$ of the balance cylinder system 50 becomes 0 and then ends the processing.

Note that the die opening control may also be conducted in the same way as the die closing control. That is, the rotational direction of the servo motor 43 etc. is reversed from the die closing operation and, at step S5, it is judged whether or not the die opening position has been reached.

According to the above embodiment, the movement mechanism 30 has only one ball-screw feed mechanism 40 and one balance cylinder system 50 for reducing the load of the only one ball-screw feed mechanism, so a reduction of the number of ball-screw feed mechanisms 40 and a reduction of the load of the ball-screw feed mechanism 40 can be achieved. This result allows precision control of the ball-screw feed mechanism while enabling lower cost. Further, the screw shaft 41 and the moveable member 44 can also be prevented from the touch in the lean state.

The control system 70 controls the operation of the hydraulic circuit 55 based on the information of the output of the servo motor 43 included in the servo motor drive output data so that the load torque of the servo motor 43 becomes a torque corresponding to the force dF, that is, so that the load of the servo motor 43 is kept at a predetermined setting, so the biasing force of the balance cylinder system 50 is controlled optimally in accordance with the fluctuations of the resistance force during movement of the moveable die plate 4.

The accumulator 59 communicated with the oil passage 58 is provided downstream of the oil pressure controller 57, so the sudden pressure fluctuations of the oil pressure from the oil pressure feeder 56 and oil pressure controller 57 are absorbed by the accumulator 59. Due to this, for example, the inability of the servo motor to be reduced in load fast enough to keep up with the increase from the target value in the biasing force of the balance cylinder system 50 can be prevented and the speed of the moveable die plate 4 is kept at the target value.

This present invention is not limited to the above embodiment and may be worked in various ways.

The molding machine wherein the die clamping system of the present invention is applied is not limited to a die cast machine. The molding machine includes a metal molding machine, a plastic injection molding machine, a sawdust molding machine, etc. Sawdust molding machines include, for example, machines molding a material comprised of sawdust mixed with a thermoplastic resin.

The balance cylinder system may be any one controlling the pressure of the fluid inside the cylinder chambers so as to obtain a drive force and is not limited to an oil pressure type. For example, an air-pressure type balance cylinder system may be used. Note that, in this case, to alleviate changes in the pressure of the cylinder chambers of the balance cylinder system, an air tank may be provided in place of the accumulator.

The control by the balance cylinder system may be any one reducing the load of the motor of the ball-screw feed mechanism and is not limited to feedback control based on the motor output. For example, it may be designed as shown in the following FIG. 5 to FIG. 7.

Figure 5:
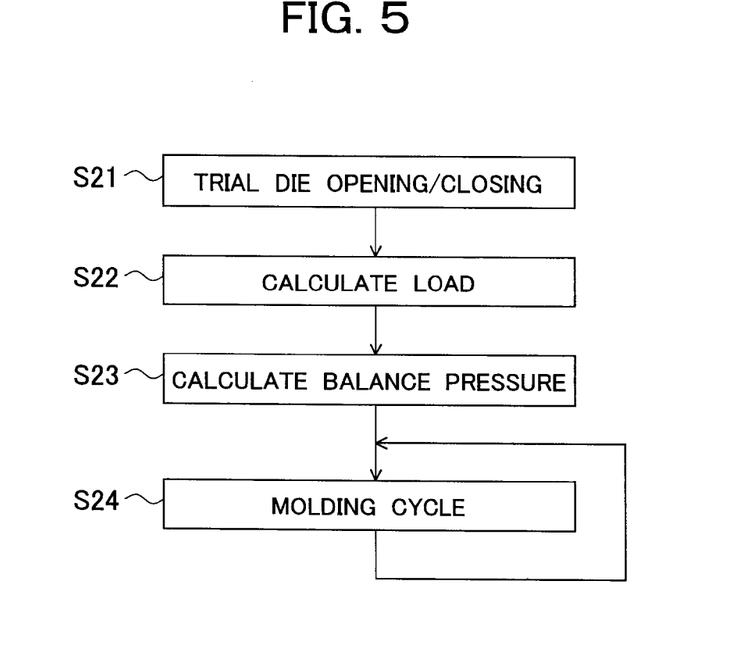
FIG. 5 is a view showing a modification of a method for controlling a balance cylinder system.

FIG. 5 shows a modification of method of control of the balance cylinder system 50. Note that the clamping system 1 is configured the same as the afore-mentioned embodiment.

At step S21, the control system 70 conducts a trial die opening and closing operation in a state wherein the biasing force by the balance cylinder system is 0. During this, the control system 70 records the servo motor drive output data output from the servo amplifier 74 linked with the position of the moveable die plate 4.

At step S22, based on the servo motor drive output data, the control system 70 calculates the load of the servo motor 43. It calculates the load based on, for example, the electric current output from the servo amplifier 74 to the servo motor 43, the number of revolutions detected during that time by the encoder 80, and the T-n characteristic (torque-speed characteristic) of the servo motor 43.

At step S23, based on the calculated load, control system 70 calculates the balance pressures and converts it into data.

For example, it calculates a biasing force the equivalent of the calculated load or smaller by dF as a biasing force to be generated by the balance cylinder system 50 and calculates the balance pressures. Note that the balance pressures calculated at this time changes with the position of the moveable die plate 4.

Afterwards, the molding cycle (step S24) is repeated until the predetermined end conditions are fulfilled. In the die opening and closing operation of each molding cycle, the control system 70 determine the positions of the moveable die plate 4 based on the detection value from the encoder 80, reads the balance pressures corresponding to that position from the data generated at step S23, and controls the operation of the balance cylinder system 50 so as to obtain that balance pressures.

In the case of the modification of FIG. 5, in comparison to the afore-mentioned embodiment, the balance pressures cannot be made to track very small fluctuations occurring at each molding cycle in the resistance force of the moveable die plate, but the balance pressures can be made to track changes in the resistance force caused due to differences between the static friction coefficient and the dynamic friction coefficient, changes in the resistance force due to the speed dependence of the dynamic friction coefficient and the positional dependence of the resistance force between the moveable die plate 4 and the base 2, and other common fluctuations.

Figure 6:
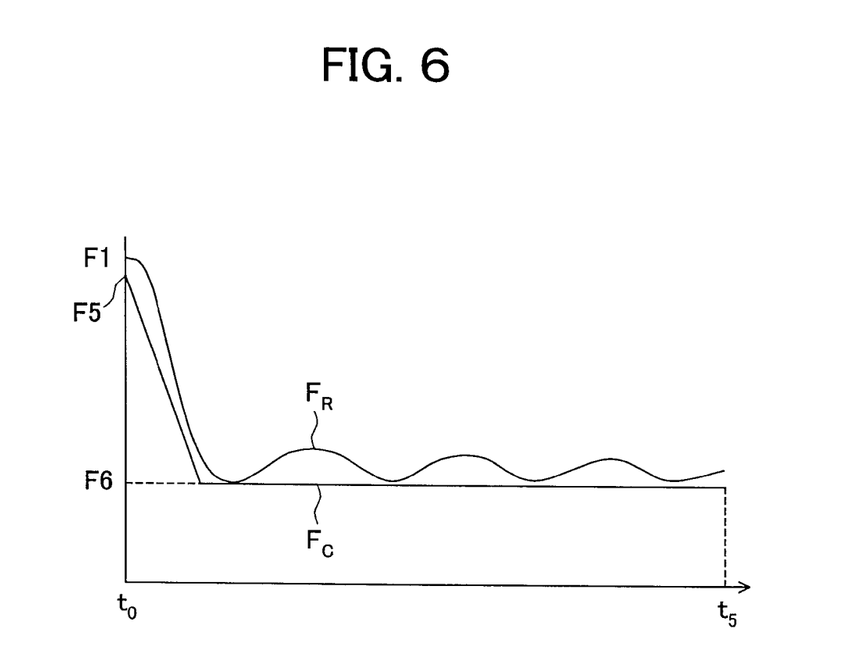
FIG. 6 is a view showing another modification of a method for controlling a balance cylinder system.

FIG. 6 shows another modification of the method of control of the balance cylinder system 50. As shown in FIG. 6, the biasing force Fc of the balance cylinder system 50 may be made to changed to only two preset magnitudes so as to correspond to the difference of the static friction coefficient and the dynamic friction coefficient. For example, the biasing force of the balance cylinder system 50 is set to F5 substantially equivalent to the static frictional force at the beginning of movement of the moveable die plate 4. After the confirmation of the beginning of movement of the moveable die plate 4 from the detection value of the encoder 80, it is set to F6 substantially equivalent to the dynamic frictional force. Even in these cases, the ball-screw feed mechanism load can be reduced.

Figure 7:
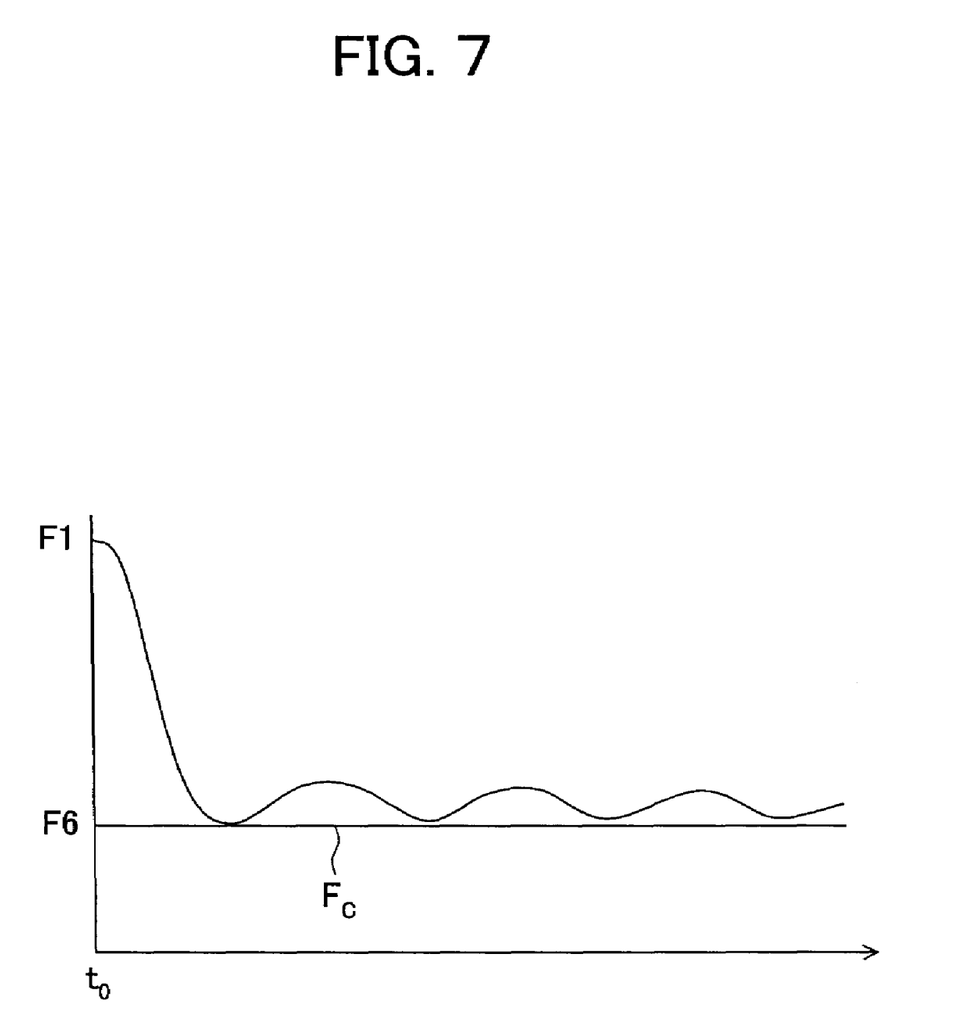
FIG. 7 is a view further showing another modification of a method for controlling a balance cylinder system.

FIG. 7 shows a further modification of the method of control of the balance cylinder system 50. As shown in FIG. 7, the biasing force Fc of the balance cylinder system 50 may be made a constant value set in advance. For example, the biasing force of the balance cylinder system 50 is maintained at F6 substantially equivalent to the dynamic frictional force. Even in this case, the load of the ball-screw feed mechanism can be reduced. Further, even in a case such as in FIG. 7 wherein the biasing force Fc of the balance cylinder system 50 is kept constant, as the piston 52 of the balance cylinder system moves with the movement of the moveable die plate 4, during the movement of the moveable die plate 4, it is necessary for the pressures of the first cylinder chamber CA and second cylinder chamber CB to be kept constant, further, it is necessary to change the pressures along with the changing of the movement direction or stopping of the moveable die plate 4 in the control.

The fluid pressure control feeding part may be any one controlling the pressure of the cylinder chamber of the balance cylinder system so as to control the drive force of the balance cylinder system and may be configured as appropriate. For example, the accumulator of the oil pressure feeder 56 may be omitted, and an accumulator 59 for alleviating pressure changes may be provided at an appropriate position of the oil pressure controller 57.

If the ball-screw feed mechanism has a single screw shaft, it may be the to be a single mechanism. For example, a plurality of moveable members and servo motors may also be provided. If the balance cylinder system has one cylinder, it may be the to be a single system.

While the invention has been described by reference to specific embodiments chosen for the purposes of illustration, it should be apparent that numerous modifications could be made thereto by those skilled in the art without departing from the basic concept and scope of the invention.

The invention claimed is:

1. A die opening and closing system comprising:
a fixed die plate holding a fixed die,
a moveable die plate holding a moveable die and able to move in a horizontal die opening and closing direction with respect to said fixed die plate,
only one ball-screw feed mechanism moving said moveable die plate in a die opening and closing direction, and
only one balance cylinder system reducing a load of said ball-screw feed mechanism.

2. A die opening and closing system set forth in claim 1, wherein
said ball-screw feed mechanism has;
only one rotatable screw shaft extending in said die opening and closing direction and limited in movement in an axial direction with respect to said fixed die plate,
a movable member fixed to said moveable die plate and into which said screw shaft is screwed, and
a motor rotating said screw shaft to move said moveable member in a die opening and closing direction;
said balance cylinder system has;
a rod fixed to one of said moveable die plate and fixed die plate,
a piston fixed to said rod, and
only one cylinder fixed to the other of said moveable die plate and fixed die plate, holding said piston, and having a first cylinder chamber and a second cylinder chamber divided by said piston; and
the system further comprises;
a fluid pressure control feeding part feeding fluid to said first cylinder chamber and said second cylinder chamber to control the pressure of said first cylinder chamber and said second cylinder chamber, and
a controlling part controlling operations of said motor and said fluid pressure control feeding part.

3. A die opening and closing system set forth in claim 2, wherein said controlling part, based on an output of said motor, maintains the load of said motor to a predetermined value by controlling the operation of said fluid pressure control feeding part.

4. A die opening and closing system set forth in claim 2, wherein said fluid pressure control feeding part has an air tank or an accumulator alleviating pressure changes of said first cylinder chamber and said second cylinder.

5. A die opening and closing method making a moveable die plate holding a moveable die advance and retract in a horizontal die opening and closing direction with respect to a fixed die plate holding a fixed die, which comprises
providing only one ball-screw feed mechanism moving said moveable die plate in a die opening and closing direction and only one balance cylinder system reducing a load of said ball-screw feed mechanism and,
based on an output of a motor serving as a drive source of said ball-screw feed mechanism, maintains a load of said motor at a predetermined value by controlling an operation of said balance cylinder system.

\* \* \* \* \*